April 20, 1937.　　　　R. L. STEVENS　　　　2,077,497
SPRING
Filed April 26, 1934　　　2 Sheets-Sheet 1
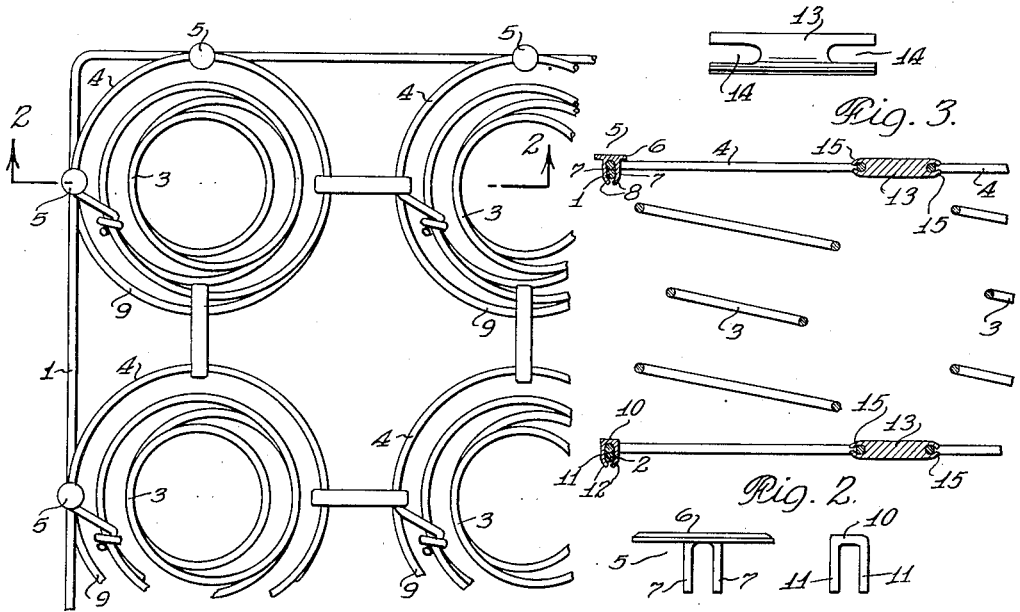
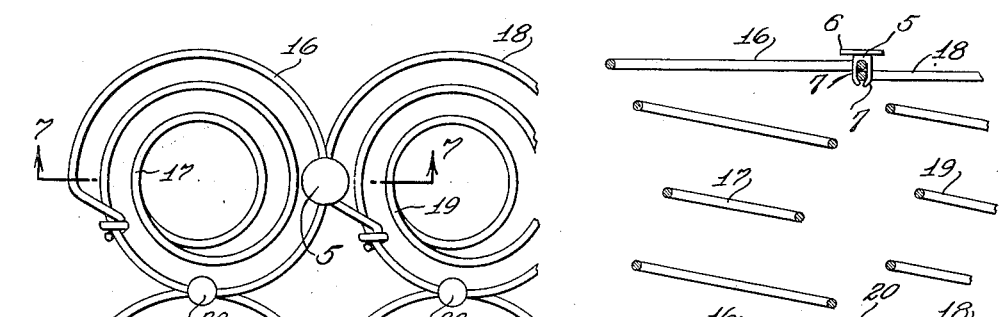
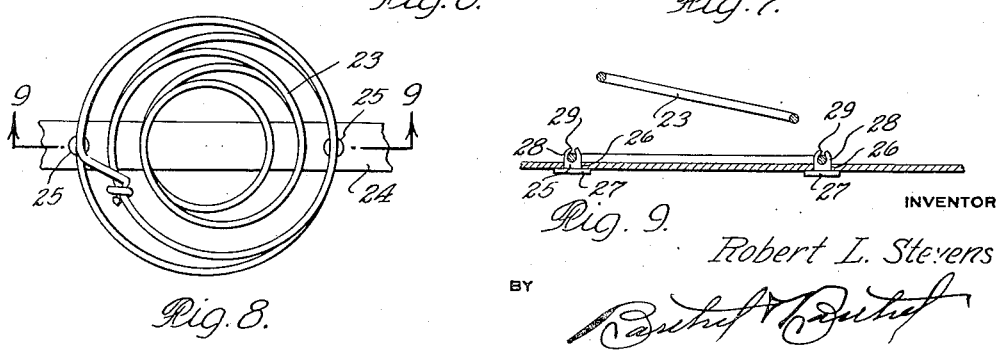
INVENTOR
Robert L. Stevens
BY
ATTORNEYS April 20, 1937.   R. L. STEVENS   2,077,497
SPRING
Filed April 26, 1934   2 Sheets-Sheet 2
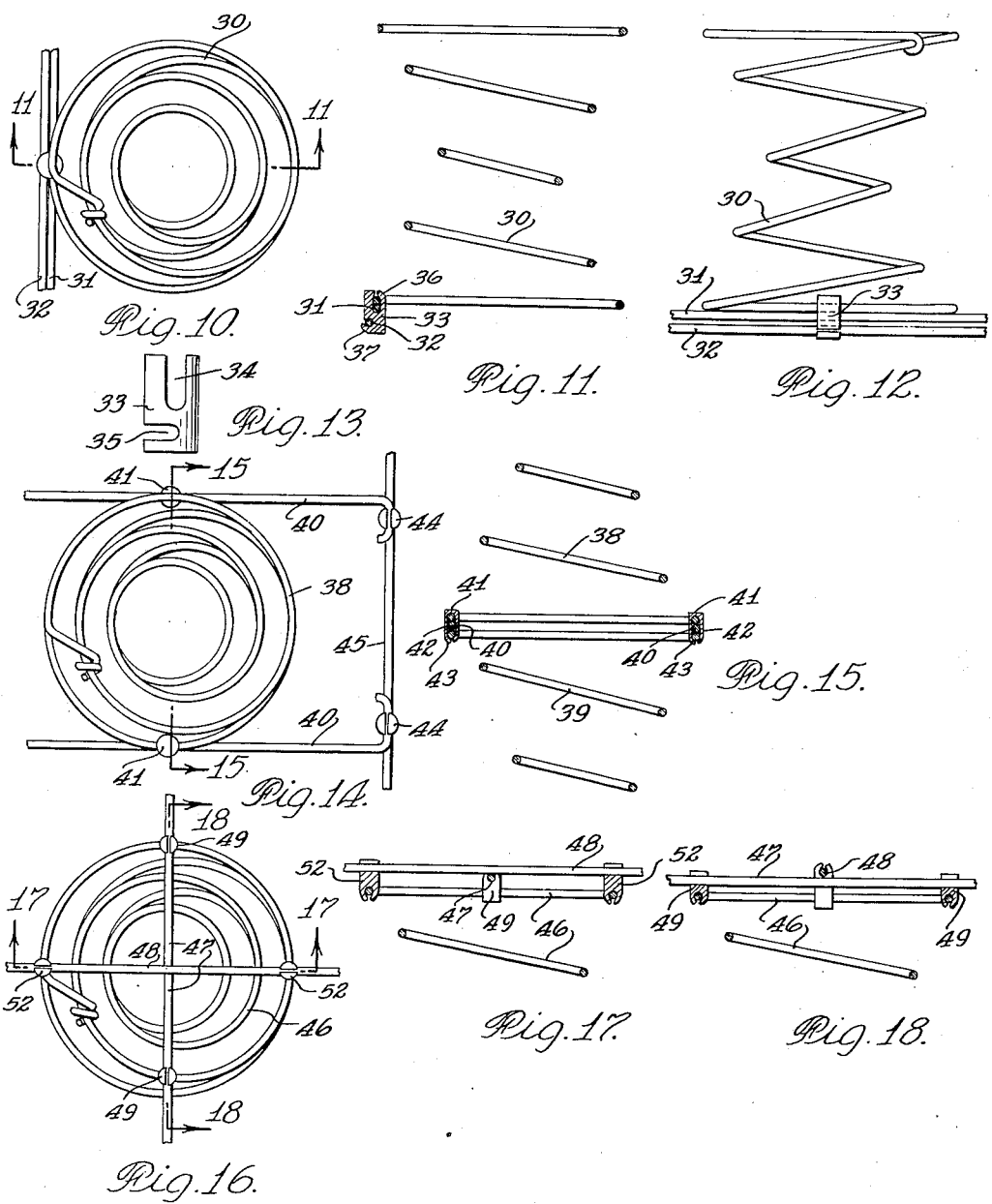
INVENTOR
Robert L. Stevens
BY
ATTORNEYS Patented Apr. 20, 1937

2,077,497

UNITED STATES PATENT OFFICE 2,077,497

SPRING

Robert L. Stevens, Detroit, Mich.

Application April 26, 1934, Serial No. 722,407

2 Claims. (Cl. 5—259)

The present invention pertains to a novel means for securing the several coil springs of a spring construction together and to a marginal frame.

In conventional spring constructions a plurality of coiled springs are ordinarily arranged in rows and are surrounded by a frame formed of a light rod bent to the required form. The primary object of the present invention is to provide an efficient means for securing the several coiled springs together and to the surrounding frame member, the securing means being constructed to permit them to be rapidly secured in place by use of a specially designed clamping tool. The present device is constructed to facilitate much more rapid and positive assembly than the usual wire clips which are ordinarily used to secure the coil springs together and to their frame members.

Another object of the invention is to provide an efficient securing means for connecting the several spiral coils of a spring construction to various types of frame reinforcing members or straps.

With the above and other ends in view the invention consists in matters hereinafter set forth and illustrated in the accompanying drawings, wherein Figure 1 is a fragmentary plan of a spring construction;

Fig. 2 is a cross section taken on the line 2—2 of Fig. 1;

Figs. 3, 4 and 5 are elevations of clips used in the assembly shown in Figs. 1 and 2;

Fig. 6 is a plan of a plurality of coil springs secured together;

Fig. 7 is a cross section on the line 7—7 of Fig. 6;

Fig. 8 is a plan of a coil spring secured to a reinforcing strap member;

Fig. 9 is a cross section taken on the line 9—9 of Fig. 8;

Fig. 10 is a plan view illustrating a fragment of a marginal frame with a coil spring secured thereto;

Fig. 11 is a cross section taken on the line 11—11 of Fig. 10;

Fig. 12 is a side elevation corresponding with Fig. 10;

Fig. 13 is an elevation of the clip used in the assembly shown in Figs. 10, 11 and 12;

Fig. 14 is a fragmentary plan of another form of spring construction;

Fig. 15 is a cross section taken on the line 15—15 of Fig. 14;

Fig. 16 is a plan illustrating a coiled spring with crossed reinforcing rods secured thereto;

Figs. 17 and 18 are cross sections taken respectively on lines 17—17 and 18—18 of Fig. 16;

Figs. 19, 20 and 21 are elevations of securing elements.

In Figs. 1 and 2 there is illustrated a spring construction comprised of upper and lower frame members 1 and 2 respectively. The frame members are formed of comparatively light metal rods bent to the desired shape. Spirally coiled springs 3 are disposed within the frame members 1 and 2 and are arranged in rows. The upper convolution 4 of each spring 3 abutting the upper frame member 1 is secured to the frame member by clips 5. The clips 5 are shown in detail in Fig. 4 and comprise a large flat head 6 with a pair of integral spaced apart arms 7. As illustrated in Fig. 2 both the upper convolution 4 and the frame member 1 extend between the arms 7 and the latter are bent over as at 8 to retain them between the arms.

By means of the retaining members 5 the upper convolutions 4 are attached to the frame member 1 in a manner to permit pivotal movement of the convolution 4 relative to the frame member 1, and also to permit lengthwise sliding movement. The large head 6 serves as a large bearing surface so as to eliminate the possibility of the securing member 5 piercing any article which might be placed on top of the spring construction.

The bottom convolutions 9 of the outside springs 3 are secured to the bottom frame member 2 by fastening elements such as are illustrated in Fig. 5, and which comprise a body 10 which is pierced throughout a portion of its length to form a pair of spaced apart arms 11. The body 10 is placed so that the bottom convolution 9 and the lower frame member 2 are disposed between the arms 11, and the latter are then bent over as at 12 to secure said parts therein.

The several coil springs 3 are joined, one to another, at both top and bottom by securing elements such as shown in detail in Fig. 3. These securing elements comprise an elongated body 13 formed with slots 14 in the ends thereof. The slots 14 receive the upper or lower convolutions, as the case may be, of adjacent springs 3 and the metal defining the slots 14 is then bent around the received convolutions as at 15 so as to retain the convolutions within the slots. Thus the springs 3 are tied together by means which permits relative pivotal movement.

The securing elements 13 are formed so as to tie the several coiled springs in spaced apart relation. As illustrated in Fig. 6, however, there is another form of spring construction wherein the several coils are not spaced apart but are secured directly, one to another. In this form the upper and lower convolutions 16 of one spring 17 are placed so that they overlap the upper and lower convolutions 18 of the spring 19. Securing elements 20 having arms 21 spaced apart are placed over the lower convolutions 16 and 18 and the arms 21 are then bent over as at 22 to secure the element in place. As shown at the upper parts of Figs. 6 and 7, securing elements of the type designated 5 and described above, are illustrated as tying the upper convolutions 16 and 18 together.

In Figs. 8 and 9 there is illustrated a coiled spring 23 secured to a strap member 24, the latter being of the type used to reinforce certain types of spring constructions. The retainer members 25 are inserted in apertures 26 in the strap 24 so that heads 27 on their lower ends engage the bottom surface of the strap member and so that spaced apart arms 28 project above the strap member to receive one of the coils of the spring 23. The arms 28 are then bent over as at 29 to secure the coil spring 23 relative to the strap member 24.

In Figs. 10, 11 and 12 there is illustrated a coiled spring 30 which is to be secured to a frame composed of two parallel relatively light rods 31 and 32 which are slightly spaced apart. The securing element for this arrangement is illustrated in Fig. 13 and comprises a body 33 having a slot 34 entering one end thereof and a slot 35 entering from the side and extending at right angles to the slot 34. The frame member 31 and the lower coil of the spring 30 are received in the slot 34 and the end of the body 33 is then bent as at 36 to retain said parts within the slot. The frame member 32 is received within the slot 35 and the body 33 is then bent as at 37 to retain the member 32 within the slot 35.

In Figs. 14 and 15 are illustrated a pair of superimposed coiled springs 38 and 39 which are secured together and to a pair of reinforcing rods 40 by retainer members 41 which have a pair of spaced apart arms 42 between which coils of both springs 38 and 39, as well as one of the rods 40 extend. The arms 42 are then bent over as at 43 to retain the securing element in place. Similarly constructed securing elements 44 are employed to secure the reinforcing members 40 to a frame member 45.

In Figs. 16, 17 and 18 there is illustrated a coiled spring 46 which is to be connected to a pair of reinforcing rods 47 and 48 which extend at right angles to one another. The securing element for connecting the spring to the rod 47 is shown in detail in Fig. 19 and comprises a body 49 having slots 50 and 51 entering opposite ends thereof and disposed in planes at right angles to one another. The slot 50 receives the rod 47 and the slot 51 receives the upper coil of the spring and the body 49 is then bent to prevent removal of said parts from their respective slots. The rods 48 are secured in place by securing elements such as shown in detail in Fig. 21, and which comprise a body 52 of slightly greater length than the body 49. The body 52 has slots 53 and 54 entering from opposite ends thereof and arranged in planes at right angles to one another. The slot 53 receives the rod 48 and the slot 54 receives the upper coil of the spring 46 and the body is then bent so as to prevent removal of the parts from their respective slots.

Although specific embodiments of the present invention are shown it will be understood that such changes as fall within the scope of the appended claims may be made without departing from the spirit of the invention.

What I claim is:—

1. In combination, a pair of coil springs, a securing element uniting convolutions of said springs to one another, said securing element comprising a body having an enlarged head providing a bearing surface and having a slot through which a convolution of each spring extends, and bent portions on said body retaining said convolutions in said slot.

2. In combination with a spring structure having a pair of wire members adapted to be secured together, a securing element, for tying said members together, said securing element comprising a body having an enlarged head providing a bearing surface and having a slot through which each of said members extend, and bent portions on said body retaining said convolutions in said slot.

ROBERT L. STEVENS.